US010007935B2

United States Patent
Shinzato

(10) Patent No.: US 10,007,935 B2
(45) Date of Patent: Jun. 26, 2018

(54) INFORMATION PROCESSING SYSTEM, INFORMATION PROCESSING METHOD, AND INFORMATION PROCESSING PROGRAM

(71) Applicant: Rakuten, Inc., Shinagawa-ku, Tokyo (JP)

(72) Inventor: Keiji Shinzato, Tokyo (JP)

(73) Assignee: Rakuten, Inc., Tokyo (JP)

( * ) Notice: Subject to any disclaimer, the term of this patent is extended or adjusted under 35 U.S.C. 154(b) by 344 days.

(21) Appl. No.: 14/766,072

(22) PCT Filed: Feb. 28, 2014

(86) PCT No.: PCT/JP2014/055158
§ 371 (c)(1),
(2) Date: Aug. 5, 2015

(87) PCT Pub. No.: WO2015/129044
PCT Pub. Date: Sep. 3, 2015

(65) Prior Publication Data
US 2016/0253720 A1    Sep. 1, 2016

(51) Int. Cl.
*G06F 17/30* (2006.01)
*G06Q 30/02* (2012.01)

(52) U.S. Cl.
CPC ..... *G06Q 30/0282* (2013.01); *G06F 17/3071* (2013.01); *G06F 17/30616* (2013.01); *G06F 17/30684* (2013.01)

(58) Field of Classification Search
CPC ......... G06F 17/30864; G06F 17/30867; G06C 30/02

USPC ....... 707/727, 737, 741, 767, 748, 749, 728, 707/803; 704/1, 9, 231, 266, 240
See application file for complete search history.

(56) References Cited

U.S. PATENT DOCUMENTS

| | | | | |
|---|---|---|---|---|
| 6,199,034 | B1 * | 3/2001 | Wical | G06F 17/2785 704/9 |
| 2006/0116867 | A1 * | 6/2006 | Moore | G06F 17/2827 704/2 |
| 2009/0070376 | A1 | 3/2009 | Eom et al. | |
| 2009/0319275 | A1 * | 12/2009 | Noda | G10L 13/08 704/266 |
| 2010/0153107 | A1 * | 6/2010 | Kawai | G06F 17/2715 704/240 |

(Continued)

FOREIGN PATENT DOCUMENTS

| | | |
|---|---|---|
| EP | 2653981 A1 | 10/2013 |
| WO | 2008121377 A2 | 10/2008 |

*Primary Examiner* — Jeffrey A Burke
*Assistant Examiner* — Thong Vu
(74) *Attorney, Agent, or Firm* — Sughrue Mion, PLLC

(57) ABSTRACT

The information processing system according to one embodiment includes a specifying unit and an extraction unit. The specifying unit specifies a content word co-occurring with onomatopoeia in one review among a plurality of posted reviews stored in a storage unit. The extraction unit extracts a posted sentence containing the content word from the plurality of posted reviews. In general, posted sentences or posted reviews containing onomatopoeia are likely to include users' actual experiences. By extracting the posted sentences that contain the content word which is likely to co-occur with onomatopoeia, it is possible to effectively extract the posted sentences on which users' actual experiences are written.

11 Claims, 8 Drawing Sheets

(56) References Cited

U.S. PATENT DOCUMENTS

| | | | |
|---|---|---|---|
| 2010/0185686 A1* | 7/2010 | Weigert | G06F 21/10 707/803 |
| 2010/0318525 A1* | 12/2010 | Mizuguchi | G06F 17/30657 707/748 |
| 2011/0161076 A1* | 6/2011 | Davis | G06F 3/04842 704/231 |
| 2012/0179682 A1* | 7/2012 | De Saeger | G06F 17/30401 707/737 |
| 2012/0278341 A1* | 11/2012 | Ogilvy | G06F 17/30616 707/749 |
| 2012/0290577 A1* | 11/2012 | Cai | G06F 17/30256 707/737 |
| 2012/0310966 A1* | 12/2012 | Kumar | G06F 17/3064 707/767 |
| 2012/0330976 A1* | 12/2012 | Tsuchida | G06F 17/2276 707/749 |
| 2013/0066873 A1* | 3/2013 | Salvetti | G06Q 30/0278 707/738 |
| 2013/0275429 A1* | 10/2013 | York | G06F 17/30029 707/737 |
| 2013/0311462 A1* | 11/2013 | Khan | G06F 17/2785 707/728 |
| 2014/0040275 A1* | 2/2014 | Dang | G06F 17/2785 707/741 |
| 2014/0040288 A1 | 2/2014 | Galitsky | |
| 2014/0067370 A1* | 3/2014 | Brun | G06F 17/271 704/9 |

* cited by examiner

Fig. 3

| CHEESE CAKE | | SHAMPOO | |
|---|---|---|---|
| DEGREE OF CO-OCCURRENCE | WORD | DEGREE OF CO-OCCURRENCE | WORD |
| 2.26149 | mechakucha (absolutely) | 1.88105 | gowagowa (rough) |
| 2.26149 | pittari (suitable) | 1.88105 | feeling |
| 1.99100 | texture | 1.88105 | mechakucha (absolutely) |
| 1.61845 | heavy | 1.88105 | gishigishi (coarse) |
| ... | ... | ... | ... |
| 0.00481 | greatest | 0.00079 | good |
| 0.00305 | enough | 0.00074 | chemicals |
| -0.00187 | sell | -0.00168 | add |
| -0.00187 | fashionable | -0.00282 | lot |
| ... | ... | ... | ... |
| -2.09522 | relative | -2.37961 | low price |
| -2.13296 | summer gift | -2.45406 | kind |
| -2.19518 | food and products | -2.76334 | immediate decision |
| -2.55879 | lucky | -2.93923 | barber |

Fig.4

| SAKE | |
|---|---|
| DEGREE OF CO-OCCURRENCE | WORD SET |
| 17.36207 | cool, drink |
| 12.04737 | dry taste, drink |
| 11.15989 | dry taste, delicious |
| 11.15427 | food, match |
| ⋮ | ⋮ |
| −0.03183 | price, low |
| −0.42085 | think, purchase |
| −0.91642 | present, purchase |

Fig.5

| SCORE | POSTED SENTENCE |
|---|---|
| 9.27096 | The cheese cake has the mouth melting texture and rich flavor, the brownie has a combination of the crunchy nuts and the richly sweet chocolate, and the both tasted great. |
| 5.38874 | The cake tasted creamy and sweet and sour, which suits my taste nicely. |
| 5.06472 | This cake melted smoothly, leaving the aroma in my mouth. |
| . . . | . . . |
| 0.00000 | I ate this cake for the first time. |
| 0.00000 | Oh, my goodness! |
| -0.01124 | I want to eat all of the three cakes I purchased, but have no choice but to share them with my family. |
| -0.04398 | I bought the cake for a present. |
| . . . | . . . |
| -4.44639 | I have purchased this cake at a food and products fair, and I like it very much. |
| -5.05069 | I presented this cake as a summer gift to the mother of my brother-in-law who gives me a Christmas present every year. |
| -5.61553 | I have purchased this cake many times at an online shop, a food and products fair and the like, and I know its taste. |

Fig.6

| SCORE | POSTED SENTENCE |
|---|---|
| 6.38044 | This shampoo has a light lather that rinses easily and made the hair soft after dried. |
| 5.44533 | I first felt uneasy about washing out the shampoo only lightly, but my hair was washed nicely without mess. |
| 4.15305 | I feel this makes my hair more flexible and smooth. |
| ... | ... |
| 0.00602 | I hope my hair gets better with continuous use. |
| 0.00000 | I am in my thirties. |
| -0.03609 | I have a long hair and the shampoo runs out so quickly. |
| ... | ... |
| -7.61045 | This shop is very helpful, selling this at such a low price. Ordered on Friday evening and received on Sunday! |
| -7.95625 | I always purchase this item here since I found I can get the professional product for hair salons at a low price in this shop. |
| -12.00654 | I searched for this affordable product among high-rated products and found this shop offering the lowest price, and purchased it here. |

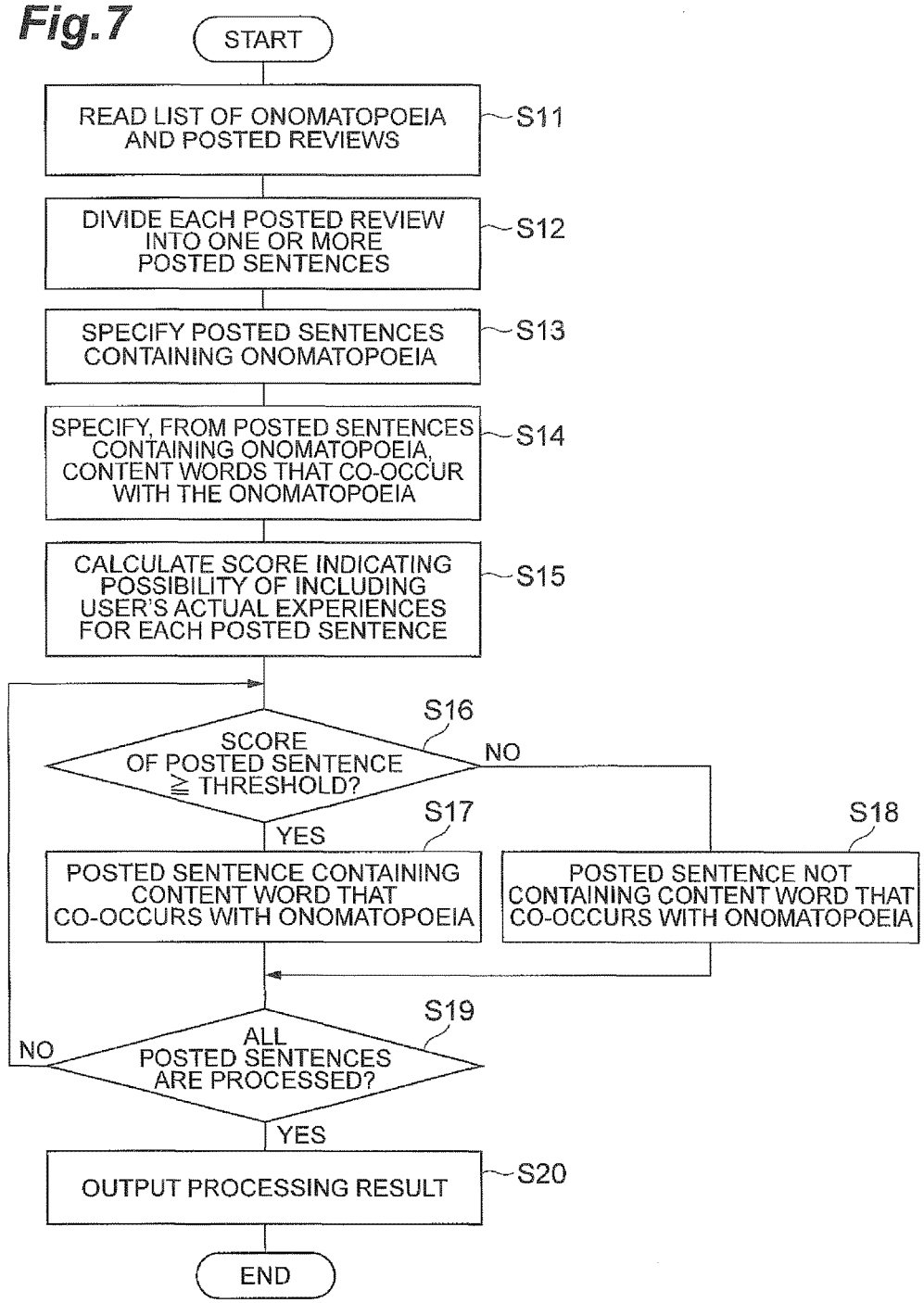

INFORMATION PROCESSING SYSTEM, INFORMATION PROCESSING METHOD, AND INFORMATION PROCESSING PROGRAM

TECHNICAL FIELD

One aspect of the present invention relates to an information processing system, an information processing method, and an information processing program for processing posted reviews.

BACKGROUND ART

A sentence or sentences posted on the Internet are sometimes used as information for another person to make a decision. For example, product reviews written by users who have used a product serve as information to make a decision for another user who is about to decide a product to purchase.

The system that manages product information using posting by users is disclosed in Patent literature 1 below. For example, this system receives product use information (posting of comments and the like) from a user's terminal and authenticates whether the user is a purchaser of a product related to the posting.

CITATION LIST

Patent Literature

PTL 1: JP 2007-141051 A

SUMMARY OF INVENTION

Technical Problem

However, there are various contents of posted reviews, and not all of them can be used as information for another person to make a decision. For example, some of the posted product reviews merely include requests for stores, and others merely say that a reviewer is looking forward to the arrival of the product. In this manner, there is a wide variety of contents of posted reviews, and not all of them are available as information for another person to make a decision. Thus, there is a need to effectively extract posted reviews on which users' actual experiences are written.

Solution to Problem

An information processing system according to one aspect of the present invention includes a specifying unit configured to specify a content word co-occurring with onomatopoeia in one review among a plurality of posted reviews stored in a storage unit, each posted review containing one or more posted sentences, and an extraction unit configured to extract a posted sentence containing the content word from the plurality of posted reviews.

An information processing method according to one aspect of the present invention is an information processing method performed by an information processing system with a processor, the method including a specifying step of specifying a content word co-occurring with onomatopoeia in one review among a plurality of posted reviews stored in a storage unit, each posted review containing one or more posted sentences, and an extraction step of extracting a posted sentence containing the content word from the plurality of posted reviews.

An information processing program according to one aspect of the present invention causes a computer to function as a specifying unit to specify a content word co-occurring with onomatopoeia in one review among a plurality of posted reviews stored in a storage unit, each posted review containing one or more posted sentences, and an extraction unit to extract a posted sentence containing the content word from the plurality of posted reviews.

According to the above aspects, content words that are likely to be used with onomatopoeia are specified, and then posted sentences that contain the content words are extracted. The present inventors have found that the content word that is likely to appear in a sentence or sentences containing onomatopoeia is likely to be used when describing a user's actual experience. Accordingly, by the above aspects based on such findings, it is expected to effectively extract posted reviews on which users' actual experiences are written.

Advantageous Effects of Invention

According to one aspect of the present invention, it is possible to effectively extract posted reviews on which users' actual experiences are written.

BRIEF DESCRIPTION OF DRAWINGS

FIG. 3 is a view showing an example of the degree of co-occurrence of words.

FIG. 4 is a view showing an example of the degree of co-occurrence of a set of words.

FIG. 5 is a view showing an example of a score of a posted sentence.

FIG. 6 is a view showing an example of a score of a posted sentence.

FIG. 7 is a flowchart showing an operation of an information processing system according to an embodiment.

DESCRIPTION OF EMBODIMENTS

Figure 1:
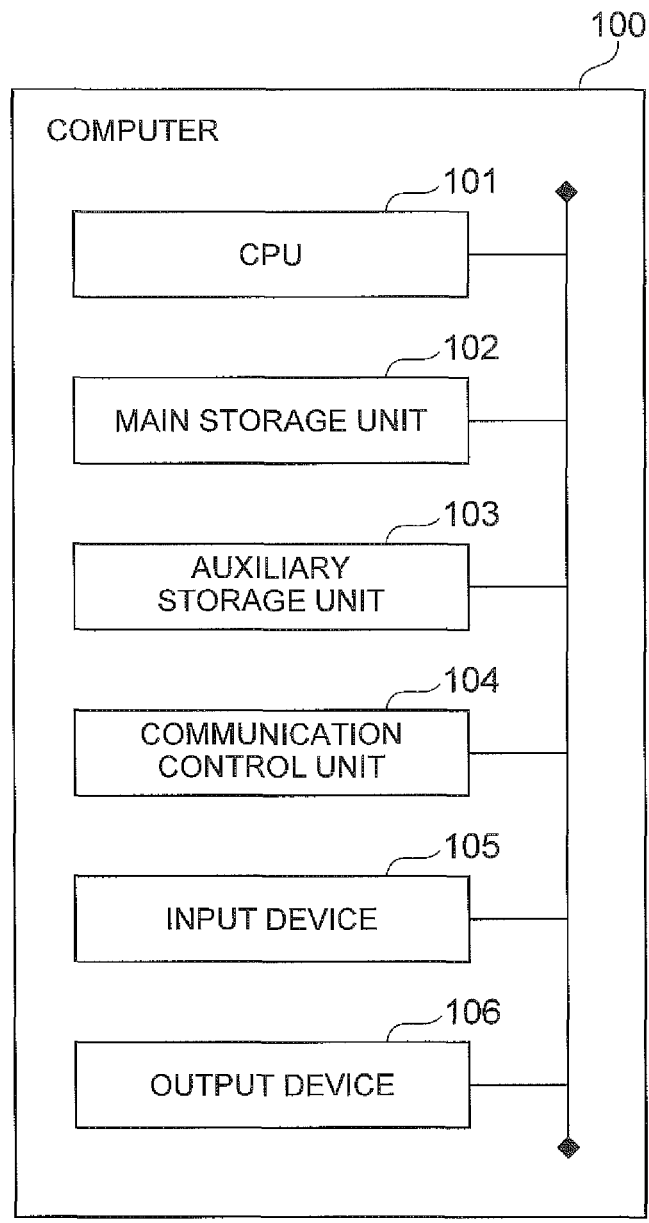
FIG. 1 is a view showing a hardware configuration of a computer to implement an information processing system according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an information processing system 10 according to an embodiment are described hereinafter with reference to FIGS. 1 to 6. The information processing system 10 is a computer system that extracts posted sentences or posted reviews that are likely to include users' actual experiences.

The "users' actual experiences" in this specification are experiences done by a reviewer, and a specific type of experiences is not limited. For example, use of a product by a user is one of actual experiences of the user. Note that the "product" in this specification is a given tangible object or a non-tangible object that can be traded for sale or for free. The tangible object is not particularly limited, and it may be movable property or immovable property. Further, the non-tangible object is also not particularly limited, and it may be provision of a given service, for example. Because the type of the product is not particularly limited, the way of "use" of a product is also not particularly limited. For example, when a product is food, the "use" of the product includes eating the food. On the other hand, when a product is the right to use an accommodation, the "use" of the product includes staying in the accommodation.

The "posted review" in this specification is a sentence or sentences that is created by a reviewer and that are published to a group including users other than the reviewer. The way the group is organized is not limited, and it may be a group which anyone can participate in (so-called an open group) or a group which only specific persons can participate in (so-called a closed group). For example, a group in which anyone can post or view a sentence on a certain website on the Internet is the open group. For another example, a group in which a person cannot post or view a sentence on a certain website on the Internet unless performing a procedure such as logging in is the closed group. The contents of a posted review are not limited. For example, a comment on a certain product (so-called a product review) is one type of the posted review, and a comment on a certain article is also one type of the posted review.

Because the type of users' actual experiences is not particularly limited as described above, the contents of "posted reviews that are likely to include users' actual experiences" are also not limited. For example, the posted review can include a comment of a user who has actually used a product, which is, a feeling of using the product. Alternatively, the posted review can include a comment of a user who has actually joined an event such as a festival or a concert.

The "posted sentence" in this specification is a sentence contained in a posted review. Because the posted review is a sentence or sentences as described above, one posted review can contain one or a plurality of posted sentences.

The information processing system 10 focuses attention on onomatopoeia in order to extract posted sentences or posted reviews that are likely to include users' actual experiences. The onomatopoeia is the concept that includes imitative words, mimetic words and echo words. Some theory says that echo words are a generic term for imitative words and mimetic words, and another theory says that echo words are a part of imitative words and, in any case, the onomatopoeia as referred to in this specification is the concept that includes imitative words, mimetic words and echo words. Because the onomatopoeia is often used as an adverb, the information processing system 10 may process only the onomatopoeia that is used as an adverb.

For example, the sentence "I like the fuwafuwa texture and the color of the cake" contains the onomatopoeia "fuwafuwa" (which is the Japanese equivalent of the English word "soft"). It can be guessed from this sentence that the reviewer has actually saw or ate the cheese cake, and the user's actual comments on the cheese cake are provided. On the other hand, the sentence "I have purchased this cake many times at an online shop, a food and products fair and the like, and I know its taste" does not contain any onomatopoeia. This sentence does not indicate that the reviewer has actually saw or ate the cheese cake, and the user's actual comments on the cheese cake are not provided. The information processing system 10 processes such posted sentences using the onomatopoeia as a clue and determines which posted review represents a user's actual experiences.

The information processing system 10 includes one or more computers and, when it includes a plurality of computers, the functional elements of the information processing system 10, which are described later, are implemented by distribution processing. The variety of each of the computers is not particularly limited. For example, a stationary or portable personal computer (PC) may be used, a work station may be used, or a mobile terminal such as an advanced mobile phone (smart phone), a cellular phone or a personal digital assistant (PDA) may be used. Alternatively, the information processing system 10 may be constructed by combining various types of computers. When using a plurality of computers, those computers are connected through a communication network such as the Internet or an intranet.

FIG. 1 shows a typical hardware configuration of each computer 100 in the information processing system 10. The computer 100 includes a CPU (processor) 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display or a printer. As a matter of course, hardware modules mounted thereon vary by the type of the computer 100. For example, while a stationary PC and a work station often include a keyboard, a mouse and a monitor as the input device and the output device, a smartphone often has a touch panel that functions as the input device and the output device.

The functional elements of the information processing system 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Before describing the functional elements of the information processing system 10, databases which the information processing system 10 refers to are described hereinbelow.

An onomatopoeia dictionary 21 is a database (storage device or storage unit) that stores a group of onomatopoeia. A specific way of implementing the onomatopoeia dictionary 21 is not limited, and the onomatopoeia dictionary 21 may be prepared as a relational database or a text file, for example. Further, the place where the onomatopoeia dictionary 21 is placed is not limited, and the onomatopoeia dictionary 21 may be located inside the information processing system 10 or located in another computer system which is different from the information processing system 10. In the case where the onomatopoeia dictionary 21 is located in another information processing system, the information processing system 10 can access the onomatopoeia dictionary 21 through a communication network.

In the case of preparing a Japanese onomatopoeia dictionary, spelling variation may be stored for one word in the onomatopoeia dictionary 21 in consideration of notational variants of each word. For example, the above-mentioned mimetic word "fuwafuwa" is written in hiragana spelling in some cases and written in katakana spelling in other cases.

In such a case, both of the hiragana version and the katakana version of the word may be stored in the onomatopoeia dictionary 21.

A posting database 22 is a database (storage device or storage unit) that stores a group of posted reviews. A specific way of implementing the posting database 22 is not limited, and the posting database 22 may be prepared as a relational database or a group of text files. Further, the place where the posting database 22 is placed is not limited, and the posting database 22 may be located inside the information processing system 10 or located in another computer system which is different from the information processing system 10. In the case where the posting database 22 is located in another computer system, the information processing system 10 can access the posting database 22 through a communication network.

The posting database 22 receives a posted review composed of one or more posted sentences, and the procedure to store the posted review into the posting database 22 is not particularly limited. For example, the posting database 22 may store a posted review written by a user on a certain website or application software. One specific example is storing a product review written on an online shopping site. As another example, the posting database 22 may store data of collected questionnaire results compiled by a data administrator. In any case, the information processing system 10 processes the posted reviews stored in the posting database 22 and does not need to consider the way each posted review has been stored into the posting database 22.

The posting database 22 may store the posted review in association with the attributes of an object reviewed (which is referred to as "reviewed object" in this specification). For example, when the posting database 22 stores a product review, the product review (posted review) may be associated with the attributes (for example, a product ID that uniquely identifies a product, a product name, a product category, a seller etc.) of the product, which is the reviewed object.

Figure 2:
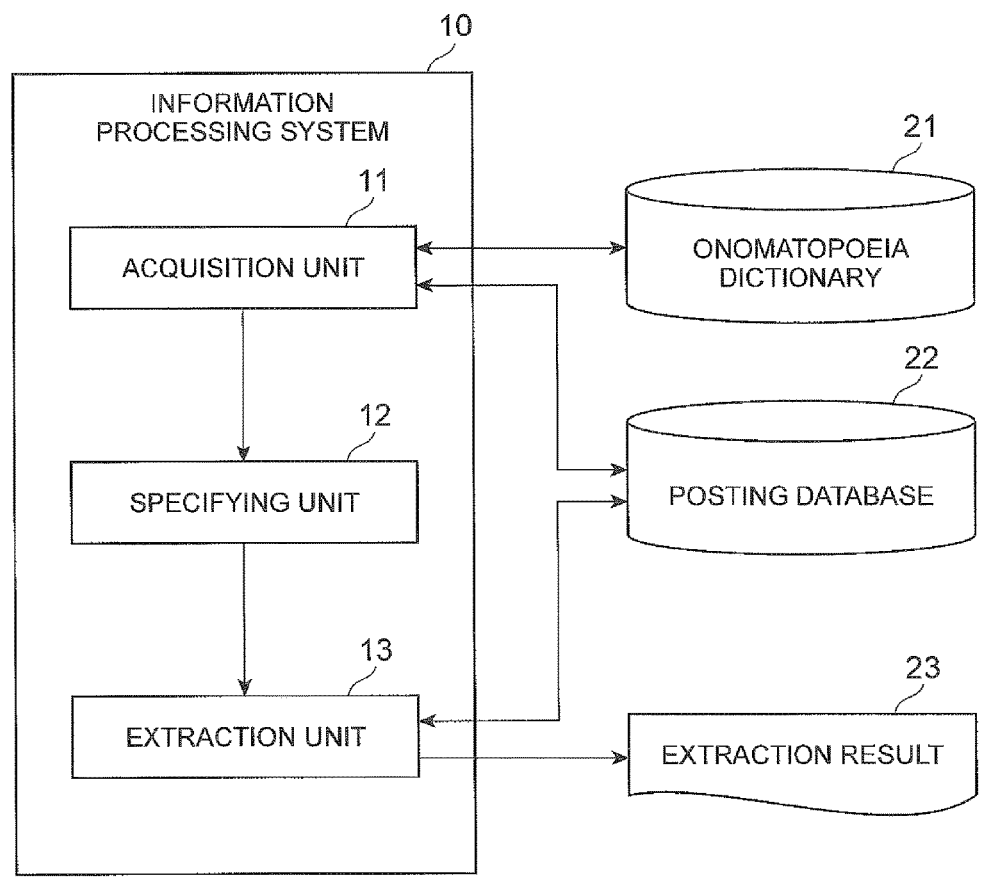
FIG. 2 is a block diagram showing a functional configuration of an information processing system according to an embodiment.

As shown in FIG. 2, the information processing system 10 includes an acquisition unit 11, a specifying unit 12 and an extraction unit 13 as functional elements.

The acquisition unit 11 is a functional element that acquires a plurality of posted sentences that contain onomatopoeia. To acquire the posted sentences containing onomatopoeia, it is necessary to recognize which one is the onomatopoeia. For this purpose, the acquisition unit 11 acquires a list of onomatopoeia by referring to the onomatopoeia dictionary 21.

Next, the acquisition unit 11 reads posted reviews from the posting database 22. At this time, the acquisition unit 11 may read only the posted reviews that correspond to a specific attribute of a reviewed object. For example, the acquisition unit 11 may read only the product reviews (posted reviews) that correspond to a specific product category (for example, "cheese cake", "shampoo" etc.). Alternatively, the acquisition unit 11 may read all posted reviews regardless of the attributes of a reviewed object.

When one read posted review contains a plurality of posted sentences, the acquisition unit 11 divides the posted review into a plurality of posted sentences by using a predetermined delimiter as a clue. Note that the type of the delimiter is not limited. For example, the acquisition unit 11 may use a symbol such as a period and a question mark, and a character string (for example, emoticon) that is idiomatically used at the end of a sentence, as the delimiter.

The acquisition unit 11 divides all of the read posted reviews into one or more posted sentences and then sets a flag indicating whether each posted sentence contains any onomatopoeia or not to the posted sentence. For example, the acquisition unit 11 sets the flag "1" to the posted sentence that contains some onomatopoeia and sets the flag "0" to the posted sentence that does not contain any onomatopoeia. In this manner, after acquiring the posted sentences that contain onomatopoeia and the posted sentences that do not contain onomatopoeia, the acquisition unit 11 outputs those posted sentences to the specifying unit 12.

The specifying unit 12 is a functional element that specifies the expression that co-occurs with onomatopoeia from each of one or more posted sentences containing the onomatopoeia (in other words, specifies the expression that co-occurs with onomatopoeia in the same posted sentence). The "expression" in this specification is a combination of one or more words, and a certain expression may be made up of one word or made up of two or more words that appear in one sentence. The "expression that co-occurs with onomatopoeia" in this specification is the expression that occurs with some onomatopoeia at a certain level of frequency or higher. As one example, the specifying unit 12 may specify a content word that co-occurs with onomatopoeia without specifying a function word. Alternatively, the specifying unit 12 may specify the expression containing a content word or a limited function word.

Note that the content word is a word that does not almost have a grammatical function and mainly represents the lexical meaning. The content word is a word that independently expresses a certain thing, concept, event, action or the like with some meaning. Examples of the content word include a noun, a verb, an adjective and an adverb. In this specification, the content word can be a combination of one or more words, and therefore a certain content word is made up of one word in some cases and made up of two or more words that are present in one sentence in other cases. When the content word is made up of two or more words, those words may appear as a sequence or appear separately from each other in a sentence.

The functional word is a word that has a grammatical function to work out a sentence and does not independently express a certain thing, concept, event or action with some meaning. Examples of the functional word include a preposition, a conjunction, an auxiliary verb, an article and a relative.

By excluding the functional words and processing the content words only, it is possible to effectively specify, among the words in which a user is likely to be interested, the word which co-occurs with onomatopoeia. Further, because the number of words to be processed is reduced, it is possible to reduce the processing load (for example, a processor activity ratio, memory consumption etc.) on the information processing system 10. Hereinafter, an example of the process of specifying the content word that co-occurs with onomatopoeia is described.

The specifying unit 12 performs morphological analysis on all of the input posted sentences and thereby divides each posted sentence into words. By this processing, the specifying unit 12 obtains a list of words. Then, the specifying unit 12 calculates the degree of co-occurrence with onomatopoeia (which is also referred to hereinafter simply as the "degree of co-occurrence") for each of the content words obtained from the word list.

For example, the specifying unit 12 may calculate the degree of co-occurrence for each word and, in this case, a difference in the degree of co-occurrence between words is likely to be significant. Alternatively, the specifying unit 12 may calculate the degree of co-occurrence for a set of two or more words. By calculating the degree of co-occurrence for a combination of words, it is possible to distinguish between the degree of co-occurrence for the positive expression such as "It tastes good" and the degree of co-occurrence for the negative expression such as "I don't think it tastes good", for example. In any case, the content word for which the degree of co-occurrence with onomatopoeia is to be calculated may be represented in any manner. For which content word the degree of co-occurrence with onomatopoeia is to be calculated may be determined by considering the type of posted reviews which a user desires to obtain in the end as the posted reviews that are likely to include users' actual experiences.

The "degree of co-occurrence with onomatopoeia" in this specification is a numerical value indicating the frequency that a certain content word appears with some onomatopoeia, and it is a numerical value indicating the strength of co-occurrence. The state where the degree of co-occurrence of a certain content word Ea is higher than the degree of co-occurrence of another content word Eb means that the content word Ea is more likely to appear with onomatopoeia compared with the content word Eb.

For example, the degree of co-occurrence $S(w)$ of a certain word w can be obtained by the equation: $S(w)=\log [P(w,O)/\{P(w)P(O)\}]$.

In the above equation, $P(w,O)$ indicates the probability of the presence of a posted sentence that contains both of a word w and some onomatopoeia among all of the posted sentences input from the acquisition unit 11 (a group of posted sentences that contain onomatopoeia and posted sentences that does not contain onomatopoeia). Illustrating this with a simple example, when it is assumed that there are ten posted sentences in total, and two posted sentences among them contain a word w and specific onomatopoeia Oa, another one posted sentence contains the word w and another onomatopoeia Ob, and yet another one posted sentence contains the word w and yet another onomatopoeia Oc, $P(w,O)$ is $(2+1+1)/10=0.4$. $P(w)$ indicates the probability of the presence of a posted sentence that contains the word w among all of the input posted sentences. $P(O)$ indicates the probability of the presence of a posted sentence that contains some onomatopoeia among all of the input posted sentences. As supplementary explanation of $P(w,O)$ and $P(O)$, it should be noted that the onomatopoeia is not distinguished from one another in the calculation of the above probability.

Alternatively, the degree of co-occurrence $S(w)$ of a certain word w may be obtained by the equation: $S(w)=\log (cooc_{w,O}) \times \log [P(w,O)/\{P(w)P(O)\}]$.

In the above equation, $cooc_{w,O}$ is the number of posted sentences that contain both of the word w and some onomatopoeia. By taking the number into consideration, it is possible to set the degree of co-occurrence of the word that co-occurs with some onomatopoeia and appears frequently to be higher than the other words.

When the content word is a set composed of a plurality of words, the specifying unit 12 can calculate the degree of co-occurrence in the same logic as when it is a single word. For example, the degree of co-occurrence $S(w_s)$ of a set $w_s$ composed of a plurality of words can be obtained by the equation: $S(w_s)=\log [P(w_s,O)/\{P(w_s)P(O)\}]$.

In the above equation, $P(w_s,O)$ indicates the probability of the presence of a posted sentence that contains both of a word set $w_s$ and some onomatopoeia among all of the input posted sentences. $P(w_s)$ indicates the probability of the presence of a posted sentence that contains the word set $w_s$ among all of the input posted sentences. $P(O)$ indicates the probability of the presence of a posted sentence that contains some onomatopoeia among all of the input posted sentences. It should be also noted that the onomatopoeia is not distinguished from one another in the calculation of the probabilities $P(w_s,O)$ and $P(O)$.

Alternatively, the degree of co-occurrence $S(w_s)$ of a set $w_s$ composed of a plurality of words may be obtained by the equation: $S(w_s)=\log(cooc_{ws,O}) \times \log [P(w_s,O)/\{P(w_s)P(O)\}]$.

In the above equation, $cooc_{w,O}$ is the number of posted sentences that contain both of the word set $w_s$ and some onomatopoeia. By taking the number into consideration, it is possible to set the degree of co-occurrence of the word set that appears frequently to be higher.

As described above, although the way of calculating the degree of co-occurrence is not limited, the specifying unit 12 calculates the degree of co-occurrence with onomatopoeia for all of the content words to be processed in any case. FIGS. 3 and 4 show one example of calculation results of the degree of co-occurrence.

FIG. 3 shows examples of the degree of co-occurrence of each word obtained from the product reviews corresponding to the product category "cheese cake" and the degree of co-occurrence of each word obtained from the product reviews corresponding to the product category "shampoo". As for the examples using "cheese cake", the words such as "mechakucha" (absolutely) and "pittari" (suitable) are likely to appear with onomatopoeia, and the words such as "food and products" and "lucky" are not likely to appear with onomatopoeia. The word "gowagowa" (which is the Japanese equivalent of the English word "rough") in the example using "shampoo" is onomatopoeia and is an adjective. The reason that the degree of co-occurrence is calculated for the word is because the specifying unit 12 determines the word as an adjective by morphological analysis and calculates the degree of co-occurrence with other onomatopoeia. In this manner, there can be a case where onomatopoeia is determined as a certain part of speech such as an adjective, an adverb or a noun and selected as the word for which the degree of co-occurrence is to be calculated.

FIG. 4 shows examples of the degree of co-occurrence of each word set obtained from the product reviews corresponding to the product category "sake". The examples show that a set of the verb "cool" and the verb "drink", a set of the noun "dry taste" and the adjective "delicious" and the like are likely to appear with onomatopoeia, and a set of the noun "present" and the noun "purchase" and the like are not likely to appear with onomatopoeia.

The specifying unit 12 outputs the degree of co-occurrence of each word together with the input posted sentence to the extraction unit 13.

The extraction unit 13 is a functional element that extracts the posted sentences that contain the content word which co-occurs with onomatopoeia. The "posted sentences that contain the content word which co-occurs with onomatopoeia" are, in other words, the posted sentences that are likely to include users' actual experiences. The extraction unit 13 calculates the score $Score(s)$ indicating the possibility of including user's actual experiences for each input posted sentence s. The posted sentence with a relatively high $Score(s)$ is estimated to include a user's actual experiences, and the posted sentence with a relatively low $Score(s)$ is estimated not to include a user's actual experiences.

In the case where the degree of co-occurrence of each word is calculated, $Score(s)$ of a certain posted sentence s is obtained by counting the degree of co-occurrence $S(w)$ of the word w contained in the posted sentence s. For example, $Score(s)$ is represented by the equation: $Score(s)=\Sigma S(w)$.

In the case where the degree of co-occurrence of a word set is calculated, Score(s) of a certain posted sentence s is obtained by counting the degree of co-occurrence $S(w_s)$ of the word set $w_s$ contained in the posted sentence s. For example, Score(s) is represented by the equation: Score(s)=$\Sigma S(w_s)$.

Note that, in the case where a specific word $w_a$ appears a plurality of times in a certain posted sentence s, the extraction unit 13 counts the degree of co-occurrence of the word $w_a$ only once. Likewise, in the case where a specific word set $w_{sa}$ appears a plurality of times in a certain posted sentence s, the extraction unit 13 counts the degree of co-occurrence of the set $w_{sa}$ only once. In this manner, when the same content word appears a plurality of times, the degree of co-occurrence of the content word is counted only once in order to prevent that the score of the posted sentence varies widely by the number of appearances of a specific content word.

Note that, the extraction unit 13 may use an operation other than addition when counting the degree of co-occurrence S(w) of the word w contained in the posted sentence s.

After calculating the score of each posted sentence, the extraction unit 13 extracts the posted sentences that contain the content word which co-occurs with onomatopoeia. For example, the extraction unit 13 stores a specified threshold and extracts the posted sentence having the score that is equal to or more than the threshold as the posted sentence that contains the content word which co-occurs with onomatopoeia. The threshold may be set arbitrarily, and it may be 0, 2.0, or −1.0. Further, the threshold may vary depending on the attributes of a reviewed object or may be the same regardless of the attributes.

FIGS. 5 and 6 show one example of calculation results of the score. FIG. 5 shows the score of sentences of the product reviews that correspond to the product category "cheese cake". FIG. 6 shows the score of sentences of the product reviews that correspond to the product category "shampoo".

In the example of FIG. 5, it is assumed that the above-described threshold is 1.0. In this case, the extraction unit 13 extracts the posted sentences such as "The cheese cake has the mouth melting texture and rich flavor, the brownie has a combination of the crunchy nuts and the richly sweet chocolate, and the both tasted great" and "The cake tasted creamy and sweet and sour, which suits my taste nicely" as the posted sentences that contain the content word which co-occurs with onomatopoeia (which is, the posted sentences that include users' actual experiences) from the results of FIG. 5. Further, the extraction unit 13 extracts the posted sentences such as "I have purchased this cake many times at an online shop, a food and products fair and the like, and I know its taste" and "I have purchased this cake at a food and products fair, and I like it very much" as the posted sentences that do not contain the content word which co-occurs with onomatopoeia (which is, the posted sentences that do not include users' actual experiences).

As for the example of FIG. 6 also, the extraction unit 13 compares the score of each posted sentence with the threshold and thereby extracts the posted sentences that contain the content word which co-occurs with onomatopoeia (for example, the posted sentences with a score of equal to or more than the threshold 0) and the posted sentences that do not contain the content word which co-occurs with onomatopoeia (for example, the posted sentences with a score of less than the threshold 0).

It should be noted that the extraction unit 13 does not extract the posted sentences that contain onomatopoeia but extracts the posted sentences that contain the content word which co-occurs with onomatopoeia. For example, the sentence "The cheese cake has the mouth melting texture and rich flavor, the brownie has a combination of the crunchy nuts and the richly sweet chocolate, and the both tasted great" in FIG. 5 and the sentence "I first felt uneasy about washing out the shampoo only lightly, but my hair was washed nicely without mess" in FIG. 6 do not contain any onomatopoeia. However, those sentences have a high score, and therefore they are extracted as the posted sentences that contain the content word which co-occurs with onomatopoeia.

The extraction unit 13 associates, with each of the input posted sentences, additional information for checking whether the posted sentence contains the content word which co-occurs with onomatopoeia. The additional information may be the calculated score, a flag indicating whether it contains the content word which co-occurs with onomatopoeia, or both of the score and the flag. An example of the flag is a combination of "1" indicating that the score is equal to or more than the threshold (which indicates that the posted sentence contains the content word which co-occurs with onomatopoeia) and "0" indicating that the score is less than the threshold (which indicates that the posted sentence does not contain the content word which co-occurs with onomatopoeia).

The extraction unit 13 outputs the posted sentence with which the additional information is associated as an extraction result 23. The extraction result 23 may be output to anywhere. For example, the extraction unit 13 may display the extraction result 23 on a monitor or print it on a printer, write the extraction result 23 to a text file, or store the extraction result 23 in a storage device (which may be the posting database 22) such as a memory or a database. The way the extraction result 23 is output is also not limited, and the extraction unit 13 may output all of the posted sentences with which the additional information is associated as the extraction result 23 or may output only the posted sentences that contain the content word which co-occurs with onomatopoeia as the extraction result 23. Alternatively, the extraction unit 13 may refer to the posting database 22 and specify the posted reviews including the posted sentences that contain the content word which co-occurs with onomatopoeia and then output the specified posted reviews from the posting database 22. Alternatively, the extraction unit 13 may output the posted sentences in descending order of the score or output the posted reviews in descending order of the total score of the one or more posted sentences in the posted review. In this manner, the extraction result 23 may be output to anywhere and in any way, and in any case, it is possible to find which posted review represents a user's actual experiences by referring to the extraction result 23.

Hereinafter, the operation of the information processing system 10 and an information processing method according to this embodiment are described with reference to FIG. 7.

First, the acquisition unit 11 reads a list of onomatopoeia from the onomatopoeia dictionary 21 and reads posted reviews from the posting database 22 (Step S11). At this time, the acquisition unit 11 may read only the posted reviews that correspond to a specific attribute of the reviewed object (for example, the product reviews that correspond to a specific product category), or may read all posted reviews regardless of the attributes of the reviewed object. Next, the acquisition unit 11 divides each posted review into one or more posted sentences (Step S12). Then, the acquisition unit 11 sets a flag indicating whether the posted sentence contains any onomatopoeia to each of the posted sentences, and thereby specifies the posted sentences that contain onomatopoeia (Step S13).

Then, the specifying unit 12 specifies, from one or more posted sentences that contain onomatopoeia, content words which co-occur with onomatopoeia (Step S14, specifying step). Specifically, the specifying unit 12 divides each posted sentence into words and thereby obtains a list of words, and calculates the degree of co-occurrence with onomatopoeia for each of the content words obtained from the list. As described earlier, the way of calculating the degree of co-occurrence is not limited, and various techniques can be used.

Then, the extraction unit 13 extracts the posted sentences that contain the content word which co-occurs with onomatopoeia (extraction step). Specifically, the extraction unit 13 first calculates a score that indicates the possibility of including user's actual experiences for each of the posted sentences (Step S15). When the score of a posted sentence is equal to or more than a specified threshold (YES in Step S16), the extraction unit 13 extracts the posted sentence as the posted sentence that contains the content word which co-occurs with onomatopoeia (Step S17). On the other hand, when the score of a posted sentence is less than a specified threshold (NO in Step S16), the extraction unit 13 extracts the posted sentence as the posted sentence that does not contain the content word which co-occurs with onomatopoeia (Step S18). The extraction unit 13 performs the processing of Steps S16 to S18 for all of the posted sentences to be processed (cf. Step S19), and when all the processing is done, it outputs the extraction result 23 (Step S20). As described above, the way of outputting the extraction result 23 is not limited.

Figure 8:
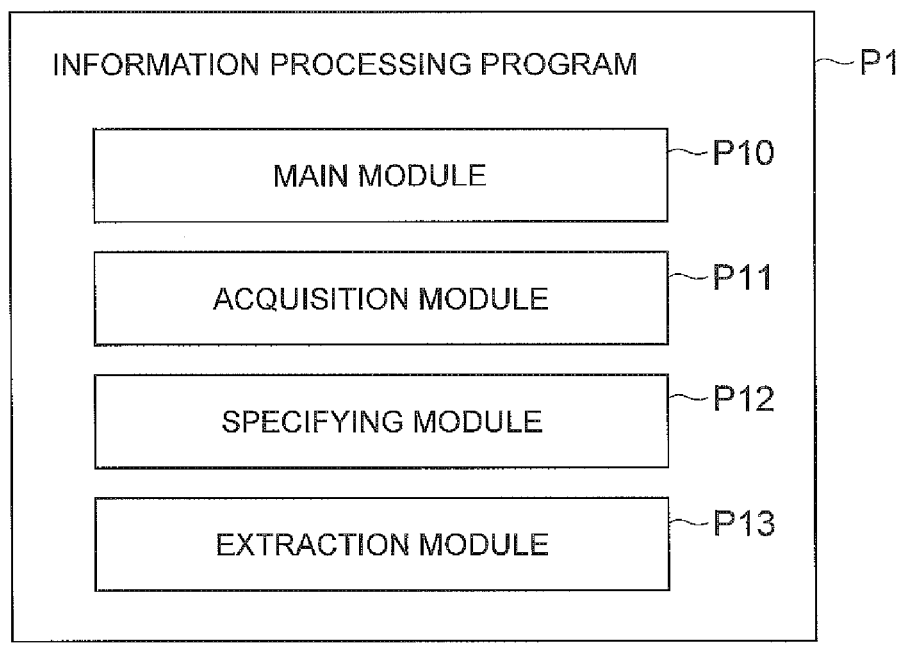
FIG. 8 is a view showing a configuration of an information processing program according to an embodiment.

An information processing program P1 for implementing the information processing system 10 is described hereinafter with reference to FIG. 8.

The information processing program P1 includes a main module P10, an acquisition module P11, a specifying module P12, and an extraction module P13.

The main module P10 is a part that exercises control over the processing related to posted reviews. The functions implemented by executing the acquisition module P11, the specifying module P12 and the extraction module P13 are equal to the functions of the acquisition unit 11, the specifying unit 12 and the extraction unit 13 described above, respectively.

The information processing program P1 is provided in the form of being recorded in a static manner on a tangible recording medium such as CD-ROM or DVD-ROM or semiconductor memory, for example. Further, the information processing program P1 may be provided as a data signal superimposed onto a carrier wave through a communication network.

As described above, an information processing system according to one aspect of the present invention includes a specifying unit configured to specify a content word co-occurring with onomatopoeia in one review among a plurality of posted reviews stored in a storage unit, each posted review containing one or more posted sentences, and an extraction unit configured to extract a posted sentence containing the content word from the plurality of posted reviews.

An information processing method according to one aspect of the present invention is an information processing method performed by an information processing system with a processor, the method including a specifying step of specifying a content word co-occurring with onomatopoeia in one review among a plurality of posted reviews stored in a storage unit, each posted review containing one or more posted sentences, and an extraction step of extracting a posted sentence containing the content word from the plurality of posted reviews.

An information processing program according to one aspect of the present invention causes a computer to function as a specifying unit to specify a content word co-occurring with onomatopoeia in one review among a plurality of posted reviews stored in a storage unit, each posted review containing one or more posted sentences, and an extraction unit to extract a posted sentence containing the content word from the plurality of posted reviews.

According to the above aspects, content words that are likely to be used with onomatopoeia are specified, and then posted sentences that contain the content words are extracted. The present inventors have found that the content word that is likely to appear in a sentence or sentences containing onomatopoeia is likely to be used when describing a user's actual experience. Accordingly, by the above aspects based on such findings, it is expected to effectively extract posted reviews on which users' actual experiences are written.

This embodiment is applicable to various situations. For example, by extracting only the posted reviews on which users' actual experiences are written, only the posted reviews that are likely to be helpful to a viewer of the posted reviews are transmitted and displayed on the terminal of the viewer. Therefore, it is possible to reduce the amount of communication between the terminal and a server and display many effective posted reviews on the terminal screen with a limited size. Further, the viewer can easily find a desired posted review. If this embodiment is applied to display of product reviews on an online shopping site, a viewer who accesses the site can form a concrete image of each product and thereby make a decision about purchasing the product more easily, which makes the site more accessible.

In an information processing system according to another aspect, the specifying unit may divide the plurality of posted reviews to obtain one or more content words, calculate a degree of co-occurrence with onomatopoeia for each of the content words and thereby specify the content word co-occurring with onomatopoeia. In this manner, by using the degree of co-occurrence as an index, it is possible to objectively specify the content word which co-occurs with onomatopoeia.

In an information processing system according to another aspect, the extraction unit may count the degree of co-occurrence of the content words contained in one posted sentence and thereby obtain a score of the one posted sentence, and then extract the posted sentence with the score of equal to or more than a specified threshold. In this manner, by using the score obtained from the degree of co-occurrence as an index and comparing the score with a threshold, it is possible to objectively extract the posted sentences that contain the content word which co-occurs with onomatopoeia.

In an information processing system according to another aspect, when a same content word appears a plurality of times in the one posted sentence, the extraction unit may count the degree of co-occurrence of the content word only once. In this case, it is possible to prevent that the score of the posted sentence varies widely by the number of appearances of a specific content word.

In an information processing system according to another aspect, each of the content words may be a word, and the extraction unit may count the degree of co-occurrence of the word contained in the one posted sentence. In this case, because a difference in the degree of co-occurrence between words is likely to be significant, a difference in the score of posted sentences is also likely to be significant. As a result, it is possible to easily distinguish between the posted sentences including users' actual experiences and the posted sentences not including users' actual experiences.

In an information processing system according to another aspect, the content word may be a set of a plurality of words, and the extraction unit may count the degree of co-occurrence of the set of a plurality of words contained in the one posted sentence. In this case, it is possible to distinguish between the degree of co-occurrence for a positive expression and the degree of co-occurrence for a negative expression, for example.

An embodiment of the present invention is described in detail above. However, the present invention is not limited to the above-described embodiment. Various changes and modifications may be made to the present invention without departing from the scope of the invention.

The onomatopoeia dictionary 21 may be prepared for each attribute (for example, for each product category) of reviewed objects, or only one dictionary may be prepared regardless of the attributes. In the case of preparing the one onomatopoeia dictionary 21 for each attribute, the attributes need to be consistent between a group of onomatopoeia to be acquired from the onomatopoeia dictionary 21 and posted reviews to be read from the posting database 22 as a matter of course. In the case of preparing only one onomatopoeia dictionary 21 regardless of the attributes of reviewed objects, a group of onomatopoeia in the onomatopoeia dictionary 21 are used for every processing.

The acquisition unit 11 may output the posted reviews that contain onomatopoeia and the posted reviews that do not contain onomatopoeia to the specifying unit 12 without dividing each posted review into a plurality of posted sentences. In this case, the variables for the specifying unit 12 to calculate the degree of co-occurrence S(w) are defined as follows:

P(w,O) . . . the probability of the presence of a posted review that contains both of a word w and some onomatopoeia among all of the posted reviews input from the acquisition unit 11 (a group of posted reviews that contain onomatopoeia and posted reviews that does not contain onomatopoeia).

P(w) . . . the probability of the presence of a posted review that contains a word w among all of the input posted reviews.

P(O) . . . the probability of the presence of a posted review that contains some onomatopoeia among all of the input posted reviews.

$cooc_{w,O}$ . . . the number of posted reviews that contain both of the word w and some onomatopoeia In the case of calculating the degree of co-occurrence $S(w_s)$ of a set $w_s$ composed of a plurality of words also, the definition of each variable is changed in the same manner.

The extraction unit 13 may calculate the score (Score(s)) for each of the posted sentences s in this modified example as well.

REFERENCE SIGNS LIST

10 . . . information processing system, 11 . . . acquisition unit, 12 . . . specifying unit, 13 . . . extraction unit, 21 . . . onomatopoeia dictionary, 22 . . . posting database, P1 . . . information processing program, P10 . . . main module, P11 . . . acquisition module, P12 . . . specifying module, P13 . . . extraction module

The invention claimed is:

1. An information processing system comprising:
at least one memory operable to store program instructions;
at least one processor operable to read said program instructions and operate according to said program instructions, said program instructions including:
acquiring instructions configured to cause at least one of said at least one processor to acquire a list of onomatopoeia by referring to an onomatopoeia database that stores a plurality of onomatopoeia, divide a posted review among a plurality of posted reviews stored in a storage unit into one or more posted sentences, and determine whether each posted sentence contains any onomatopoeia included in the list of onomatopoeia;
specifying instructions configured to cause at least one of said at least one processor to:
obtain a degree of co-occurrence with onomatopoeia, indicating a probability that a given word included in the posted review appears with any onomatopoeia included in the list of onomatopoeia within one posted sentence, by using a ratio of a probability of a presence of a posted sentence that contains both of the given word and at least one onomatopoeia among all of the one or more posted sentences to a product of a probability of a presence of a posted sentence that contains the given word among all of the one or more posted sentences and a probability of a presence of a posted sentence that contains at least one onomatopoeia among all of the one or more posted sentences, and
specify a content word, among the given word, having a certain degree of co-occurrence with onomatopoeia or higher; and
extraction instructions configured to cause at least one of said at least one processor to extract a posted sentence containing the content word from the plurality of posted reviews and output, on a display of a user terminal, via a communication network, the extracted posted sentence containing the content word.

2. The information processing system according to claim 1, wherein
the extraction instructions are further configured to cause at least one of said at least one processor to count the degree of co-occurrence of content words contained in the one posted sentence and thereby obtain a score of the one posted sentence, and then extract the posted sentence with the score of equal to or more than a specified threshold.

3. The information processing system according to claim 2, wherein the extraction instructions are further configured to cause at least one of said at least one processor to output posted sentences with the score of equal to or more than the specified threshold in a descending order of the score.

4. The information processing system according to claim 2, wherein
when a same content word appears a plurality of times in the one posted sentence, the extraction instructions cause at least one of said at least one processor to count the degree of co-occurrence of the content word only once.

5. The information processing system according to claim 2, wherein each of the content words is a word, and
the extraction instructions are further configured to cause at least one of said at least one processor to count the degree of co-occurrence of the word contained in the one posted sentence.

6. The information processing system according to claim 2, wherein
the content word is a set of a plurality of words, and
the extraction instructions are further configured to cause at least one of said at least one processor to count the degree of co-occurrence of the set of the plurality of words contained in the one posted sentence.

7. The information processing system according to claim 1, wherein the specifying instructions further configured to cause at least one of said at least one processor to process the one or more posted sentences to exclude one or more functional words, and
the degree of co-occurrence with onomatopoeia is obtained by using a ratio of a probability of a presence of a posted sentence that contains both of the given word and at least one onomatopoeia among all of the one or more processed posted sentences to a product of a probability of a presence of a posted sentence that contains the given word among all of the one or more processed posted sentences and a probability of a presence of a posted sentence that contains at least one onomatopoeia among all of the one or more processed posted sentences.

8. The information processing system according to claim 7, wherein the one or more functional words are words that do not carry a lexical meaning, and express grammatical relationships between words.

9. The information processing system according to claim 7, wherein the one or more function words comprises a preposition, a conjunction, an auxiliary verb, an article, and a relative clause.

10. An information processing method performed by an information processing system including at least one processor, the method comprising:
acquiring a list of onomatopoeia by referring to an onomatopoeia database that stores a plurality of onomatopoeia, dividing a posted review among a plurality of posted reviews stored in a storage unit into one or more posted sentences, and determining whether each posted sentence contains any onomatopoeia included in the list of onomatopoeia;
obtaining a degree of co-occurrence with onomatopoeia, indicating a probability that a given word included in the posted review appears with any onomatopoeia included in the list of onomatopoeia within one posted sentence, by using a ratio of a probability of a presence of a posted sentence that contains both of the given word and at least one onomatopoeia among all of the one or more posted sentences to a product of a probability of a presence of a posted sentence that contains the given word among all of the one or more posted sentences and a probability of a presence of a posted sentence that contains at least one onomatopoeia among all of the one or more posted sentences;
specifying a content word, among the given word, having a certain degree of co-occurrence with onomatopoeia or higher; and
extracting a posted sentence containing the content word from the plurality of posted reviews and outputting, on a display of a user terminal, via a communication network, the extracted posted sentence containing the content word.

11. A non-transitory computer readable medium storing an information processing program causing a computer to:
acquire a list of onomatopoeia by referring to an onomatopoeia database that stores a plurality of onomatopoeia, divide a posted review among a plurality of posted reviews stored in a storage unit into one or more posted sentences, and determine whether each posted sentence contains any onomatopoeia included in the list of onomatopoeia;
obtain a degree of co-occurrence with onomatopoeia, indicating a probability that a given word included in the posted review appears with any onomatopoeia included in the list of onomatopoeia within one posted sentence, by using a ratio of a probability of a presence of a posted sentence that contains both of the given word and at least one onomatopoeia among all of the one or more posted sentences to a product of a probability of a presence of a posted sentence that contains the given word among all of the one or more posted sentences and a probability of a presence of a posted sentence that contains at least one onomatopoeia among all of the one or more posted sentences;
specify a content word, among the given word, having a certain degree of co-occurrence with onomatopoeia or higher; and
extract a posted sentence containing the content word from the plurality of posted reviews and output, on a display of a user terminal, via a communication network, the extracted posted sentence containing the content word.

* * * * *